Jan. 27, 1959             J. E. RICHARDSON             2,870,960
SYSTEM FOR ANALOGUE COMPUTING UTILIZING
DETECTORS AND MODULATORS Filed May 28, 1952                                       7 Sheets-Sheet 1

INVENTOR.
John E. Richardson
BY
A R M<sup>c</sup>...
ATTORNEY

INVENTOR.
John E. Richardson.
BY
A R McCrady
ATTORNEY

Jan. 27, 1959  J. E. RICHARDSON  2,870,960
SYSTEM FOR ANALOGUE COMPUTING UTILIZING
DETECTORS AND MODULATORS
Filed May 28, 1952                                    7 Sheets-Sheet 4

INVENTOR.
BY John E. Richardson.

A R McCrady
ATTORNEY

INVENTOR.
John E. Richardson.
BY
A. R. McCrady
ATTORNEY

# United States Patent Office

2,870,960
Patented Jan. 27, 1959

2,870,960

SYSTEM FOR ANALOGUE COMPUTING UTILIZING DETECTORS AND MODULATORS

John E. Richardson, Los Angeles, Calif.

Application May 28, 1952, Serial No. 290,609

12 Claims. (Cl. 235—61)

(Granted under Title 35, U. S. Code (1952), sec. 266)

The invention described herein may be manufactured and used by or for the Government of the United States of America for governmental purposes without the payment of any royalties thereon or therefor.

This invention relates to a system for analogue computing for use with computers of the type wherein vector qualities are represented by voltages having definite phase relationships.

This application is a continuation-in-part of my copending application Serial No. 164,583, filed May 26, 1950, entitled "Electrical Computers," now U. S. Patent No. 2,733,004.

In the past, it has been difficult to perform certain computations in which functions are expressed by complex equations. For example, to obtain sine functions through computer operation, it is necessary to have either two integrators or a number of multipliers which can be used to expand a power series. The multiplier method is impractical for other than small angles, and integrators are often not available on a computer performing a number of functions simultaneously. Other prior art methods of introducing complex functions include such arrangements as feeding data as it is needed on punched cards, and manually moving an index pointer over the curve plotted on a graph as the computer operates. The instant invention provides a method and apparatus for obtaining trigonometric and many other complex functions from a single cell.

The similarity of the properties of sinusoidal voltages and the properties of vectors has been used for a number of years in analogue computers, but this use has hardly been extended beyond the solution of problems in which two voltages of different phases simulate two sides of a triangle and their sum automatically becomes the third side. By the use of circuit elements and procedures involving vector properties of A. C. voltages herein described, almost any problem of plane analytic geometry can be solved, and many problems which can be solved mechanically by bar linkages can be handled by an electrical analogue of the three bar linkage cell. In addition, problems may be solved in polar coordinates and then transferred to rectangular coordinates, and it is a simple matter to transfer the coordinates from a given reference frame to another which has been rotated and translated in space.

Suppose that a vector $\bar{R}$ lies in the $xy$ plane. Let $i$ and $j$ be two unit vectors designating a reference frame in this plane so that $\bar{R}=ix+jy$. In this case $/\bar{R}/=(x^2+y^2)^{1/2}$ and, if $\theta$ is measured between $i$ and $R$ in the counterclockwise direction, $\tan \theta = y/x$. In an analogous manner, $i$ and $j$ can be simulated by two sinusoidal voltages whose magnitudes are unity but which are at quadrature. If the voltages corresponding to $i$ and $j$ are increased $x$-fold and $y$-fold respectively and then added, the resultant voltage will equal $(x^2+y^2)^{1/2}$ in magnitude and its phase in respect to the phase of the voltage corresponding to $i$ will have a tangent equal to $y/x$. If the resultant voltage is taken to correspond to the vector $\bar{R}$, a one-to-one correspondence is observed. Two quadrature unit sinusoidal voltages are established which specify a reference frame in two-dimensional space. A third voltage of arbitrary phase and magnitude represents a vector $\bar{R}$ originating at the origin and having its terminus at the point $(x, y)$. The terminus of $\bar{R}$ is constrained to a curve which is designated by $f(x, y, c_1, c_2 \ldots c_n)$ in which $y$ and $x$ are variables and the $c$'s are parameters. The point $(x, y)$ is restricted to designated curve by the geometric properties of the curve, and the functional relationships of variables and parameters are used for analogue computing.

In general, a computing element will have input and output variables which do not correspond to the coordinates $x$ and $y$ but will be functional relationships of the coordinates and the parameters of the curve. This system is much more flexible than is at first apparent. Although $f(x, y, c_1m, c_2, \ldots c_n)$ must lie in a plane, a number of input as well as output variables are possible. When the parameters as well as the variables are varied, the terminus of $\bar{R}$ may be considered to be tracing a locus through a family of curves, and being, at any instant, on a curve determined by the instantaneous values of the parameters. It is obvious that error-sensing devices are needed to detect departures of the terminus of $\bar{R}$ from a given curve and to execute control so that the departure is minimized. In all operations that are to be considered, only two types of error-sensing devices are used. These devices will be referred to in general as detectors. The first detector compares the magnitudes of two vectors, for instance $\bar{S}$ and $\bar{T}$, and gives a zero output voltage when their magnitudes are equal. That is, $/\bar{S}/-/\bar{T}/=e$, $e \to 0$. For any other condition a D. C. output voltage is developed which is proportional to the difference in magnitude of the vectors and will have a sign depending on which vector is the larger. Such a detector will be called an amplitude detector. The second detector compares the orientation of two vectors and gives a zero output voltage when $\bar{S} \cdot \bar{T}=e$, $e \to 0$, where the dot product (sometimes termed inner or scaler product) indicates multiplication of the two vectors, that is, the product of the magnitudes of the vectors and the cosine of the angle between them. For any other condition, a D. C. output voltage will be developed whose sign is dependent on whether the angle between the two vectors is acute or obtuse. For small departures from a quadrature relationship the D. C. voltage is proportional to the departure. Such a detector will be referred to as a phase or quadrature detector. The outputs from the detectors are used as input voltages to a modulator. The output of the modulator is a harmonic-free sinusoidal voltage whose phase and amplitude are precisely controlled by D. C. voltages from the two types of detectors.

A computing element or cell consists of a number of detectors and modulators. One definition of an element or cell is that it is a unit whose operation is dependent on only one functional relationship such as $f(x, y, c_1, c_2, \ldots c_n)=0$. A number of arrangements hereinafter described consist of several cells or elements. Each cell will have one or more input voltages which are, within a given domain, entirely arbitrary. These voltages correspond to the independent variables $X_1, X_2, \ldots X_q$. Each cell will also have a number of output voltages which correspond to the dependent variables $x_1, x_2, \ldots x_m$. These variables $x$ and $y$ and the parameters $c_1, c_2, \ldots c_n$ are also dependent on the independent variables, subject to the restriction that $f(x, y, c_1, c_2, \ldots c_n)=0$. In addition to these variables there is another set, $Z_1, Z_2, \ldots Z_p$, which are within the cell and correspond to the voltages which are generated by the modulators and controlled by the detectors to maintain automatically the relationship $f(x, y, c_1, c_2, \ldots c_n) = 0$. The variables $Z_1, Z_2, \ldots Z_p$ have very important properties. They are, in general, functions of the independent variables. For each $Z_i$ there must exist an equation of the form $/\bar{S}_i/ - /\bar{T}_i/ = e_i$, $e_i \to 0$, or of the form $\bar{S}_i \cdot \bar{T}_i = e_i$, $e_i \to 0$, the subscripts associating the equation with the variable. Each of these variables must have associated with it a detector and a modulator. The symbol $e_i$ approaches zero if the instrumentation of a cell is properly done. Since each cell has been assumed to have $m$ dependent variables, there exist $m$ functional operators such that $x_1 = x_1(X_1, X_2 \ldots X_q)$, $x_2 = x_2(X_1, X_2, \ldots X_q)$, $\ldots$ and $x_m = x_m(X_1, X_2, \ldots X_q)$. Many cells contain one independent and one dependent variable and the cell itself corresponds to a single operator.

An object of the invention is to provide an improved method and apparatus wherein voltages representing vector quantities are utilized for smoothly and accurately solving equations involving complex functions of one or more variables.

Other objects and many of the attendant advantages of this invention will be readily appreciated as the same becomes better understood by reference to the following detailed description when considered in connection with the accompanying drawings, wherein.

Figure 1:
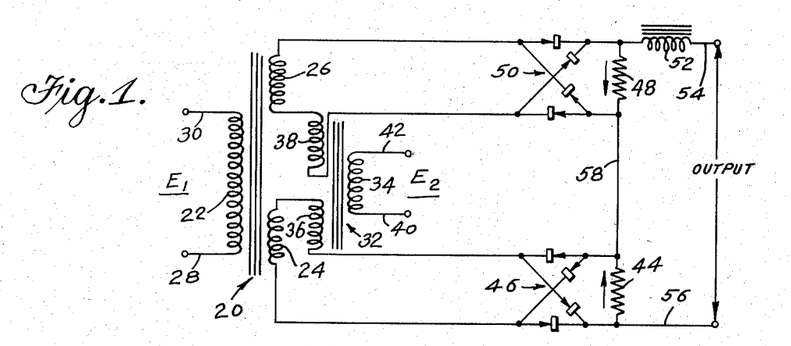
Fig. 1 is a schematic diagram of a phase detector.

The phase detector apparatus shown in Fig. 1 comprises a first transformer 20 having one primary winding 22 and two secondary windings 24 and 26. Leads 28 and 30 serve to connect the primary winding to external apparatus as will be explained below. A second transformer 32, having a single primary winding 34 and two secondary windings 36 and 38, is likewise connected to an external circuit via leads 40 and 42. Secondary windings 24 and 36 are connected in series, and their output is impressed across resistor 44 after passing through rectifier bridge 46. Secondary windings 26 and 38 are connected, as shown, in series across resistor 48 through rectifier bridge 50. A large inductance 52 is placed in output lead 54. Lead 56 provides the second output lead. Conductor 58 serves to connect resistor 44 to resistor 48.

In the operation of the phase detector, an alternating voltage $E_1$ is applied to terminals 28 and 30. A second alternating voltage $E_2$ of the same frequency is applied to terminals 40 and 42. The direction of current flow through the transformer secondaries connected as shown is such that the two voltages produced in one series pair of secondary windings are added while the two voltages produced in the other series pair of windings are added in an opposing sense and thus the final resulting voltage across resistors 44 and 48 is the difference between the two voltages applied as inputs to terminals 28 and 30 and to terminals 40 and 42. The effect of the phase detector is to compare average values of $$/E_1 + E_2/ \text{ and } /E_1 - E_2/$$

These averages are equal only if voltages $E_1$ and $E_2$ are at quadrature, i. e., 90 degrees out of phase. If the two voltages are not at quadrature a net D. C. output voltage will be developed, across output leads 54 and 56, which is directly proportional to the amount of departure from quadrature and will have a sign depending on the direction of departure. The rectifier bridges 46 and 50 provide that unidirectional current will be applied to resistors 44 and 48. Inductance 52 prevents A. C. loading as will be explained in connection with the description of the amplitude detector. The phase detector may readily be constructed to be accurate to within a few hundredths of a degree.

Figure 2:
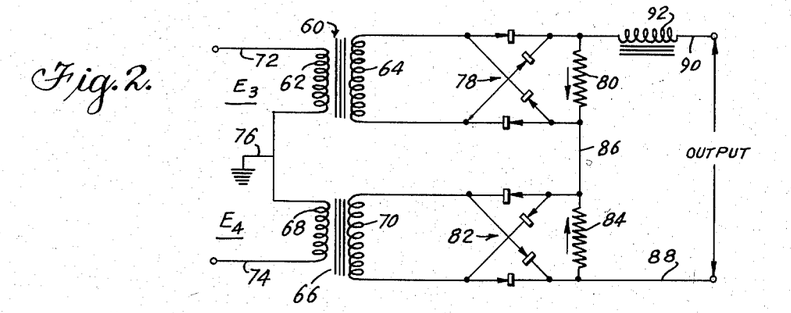
Fig. 2 is a schematic diagram of an amplitude detector.

The amplitude detector shown in Fig. 2 comprises a first transformer 60 having one primary winding 62 and one secondary winding 64. The second transformer 66 also has one primary 68 and one secondary 70. Input voltages $E_3$ and $E_4$ are applied to leads 72 and 74 respectively, and to the common ground 76. The voltage induced in secondary 64 is led through the full wave rectifier bridge 78 and impressed across resistor 80. Similarly, the voltage induced in secondary 70 is rectified in rectifier bridge 82 and impressed across resistor 84. The inner ends of resistors 80 and 84 are interconnected by means of conductor 86. Lead 88 and lead 90, which includes inductance 92, provide connections to output terminals from the outer ends of resistors 80 and 84.

The amplitude detector compares the average of $/E_3/$ and $/E_4/$ and a net D. C. output voltage across resistors 80 and 84 is produced if the input voltages are not equal. The sign of the D. C. output voltage depends upon which input voltage is the larger of the two.

The output voltages of both detectors are determined by the differences of the average voltages across the resistance loads. These averages are affected by non-sinusoidal inputs. The output voltages are independent of even harmonics and are affected by odd harmonics in proportion to $1/n$ where $n$ corresponds to the $n$th harmonic. A great amount of care must be taken not to draw harmonic currents. These currents will flow through the voltage sources producing harmonic voltages in the source impedances. In order to prevent distortion of the voltages in the computer due to non-linear loading, all detectors preferably use full-wave rectifier bridges and resistance loads. Harmonic current is drawn only when current is drawn from the output of the detectors. In case the current is supplied to the signal winding of the magnetic amplifiers hereinafter described, the D. C. component will be of the order of 50 microamperes. If a large inductance is used in the output of the detectors, especially the phase detector, to prevent A. C. loading, the harmonic currents drawn are very small. Inductances 52 and 92 also isolate the detectors from harmonic voltages which are present in the signal windings of the magnetic amplifiers. The instantaneous voltage across detector resistances may be high due to ripple, but the isolating inductances provide an average output which is a low D. C. voltage.

The output impedance of the detectors must be low in order to operate into the low-impedance signal windings of magnetic amplifiers. This impedance is determined by the forward resistance of the crystal rectifiers preferably employed in the detectors. A crystal rectifier has a nearly constant voltage drop across it in the forward direction; consequently, the impedance is inversely related to the current. The forward resistance of a germanium rectifier is roughly 1,000 ohms for a current of 200 microamperes. The output impedance of each of the detectors is roughly four times the forward resistance of a rectifier. If the resistors are of the order of 50,000 or 25,000 ohms, the back conduction of the crystal can be ignored. However, crystals should be matched in pairs and one of each pair placed in each bridge for best performance. The forward resistance of the crystals should be matched for some value of current in the middle of their operating range.

Figures 3, 5, 7:
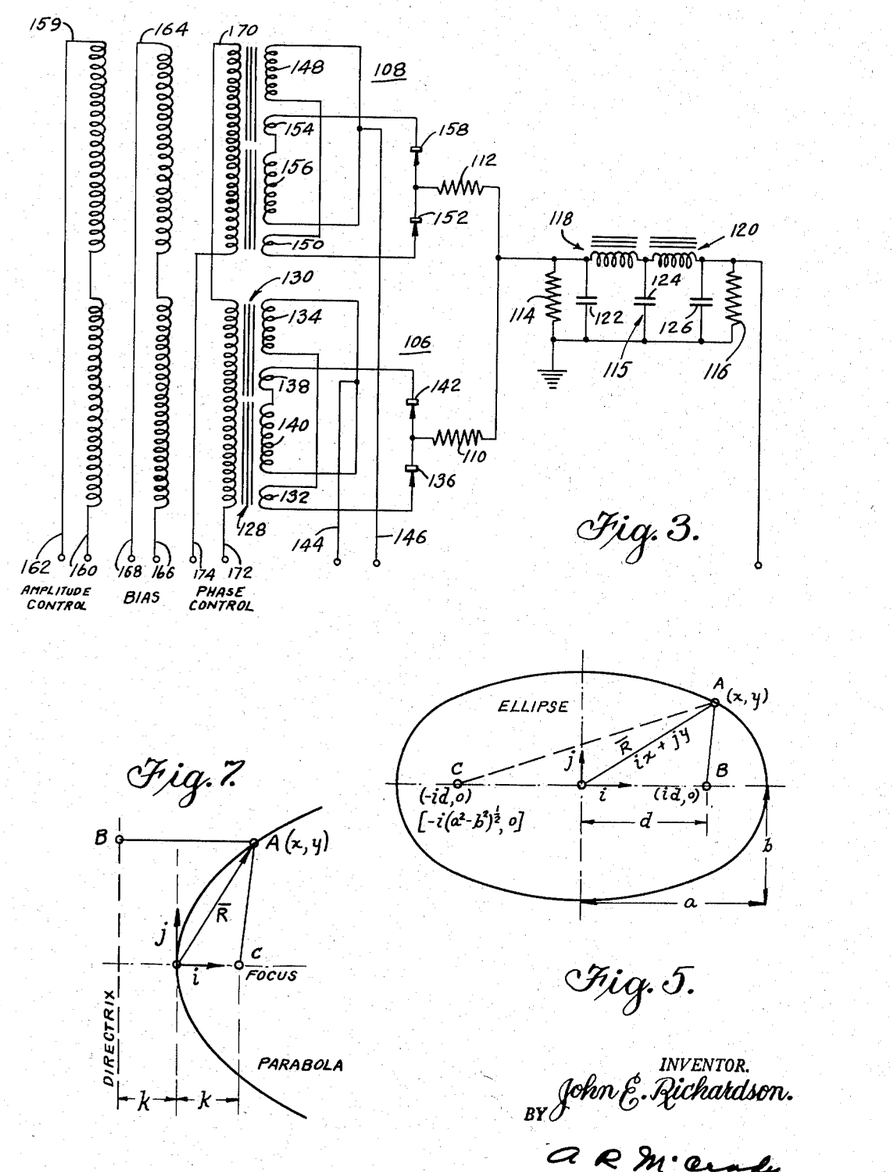
Fig. 3 is a schematic diagram of a phase and amplitude modulator.
Fig. 5 is a diagram illustrating properties of an ellipse suitable for computing purposes.
Fig. 7 is a diagram illustrating properties of a vector terminating on a parabola.

The phase and amplitude modulator shown schematically in Fig. 3 comprises two magnetic amplifiers 106 and 108, isolating resistors 110 and 112, load resistor 114, and a filter 115 which includes resistor 116, inductors 118 and 120, and capacitors 122, 124, and 126. Amplifier 106 includes two cores 128 and 130 of magnetic material. The cores are usually formed into the shape of toroids but are shown as straight for purposes of illustration. Windings 132 and 134 are placed on separate cores and in series with rectifier 136. Windings 138 and 140 are also placed on separate cores and are connected in series with rectifier 142. Lead 144 connects a first A. C. voltage to the network made up of windings 132, 134, 138, and 140. Similarly, lead 146 connects a second voltage at quadrature to said first A. C. voltage and of equal amplitude, to a network of windings 148 and 150 in series with rectifier 152, and windings 154 and 156 in series with rectifier 158. Winding 159 having leads 160 and 162 is placed on both core pairs in such manner that a current in the winding will saturate the magnetic cores of both amplifiers to the same degree and in the same direction. Winding 164 having leads 166 and 168 is similarly placed on both core pairs. Winding 170 having leads 172 and 174 is placed on both core pairs to saturate the amplifiers equally but in opposite directions. The two sections of winding 170 are essentially working in push-pull for phase control.

A direct current in either of signal windings 159 and 170 will control the degree of saturation of the cores and hence the amount of current flowing through A. C. windings 132, 134, 138, 140, 148, 150, 154 and 156. A direct current in bias winding 164 will have the same effect on the A. C. windings as direct current in the signal windings; the bias partially saturates the cores and permits operation over any desired part of the range of the amplifier. The A. C. windings are interconnected between core pairs within a magnetic amplifier in such a manner that no net induction occurs between D. C. and A. C. windings. Rectifiers 136, 142, 152, and 158 supply additional D. C. excitation or positive feedback which increases the net gain of the amplifiers. The cross-coupling of the A. C. windings effectively removes a portion of the back conduction of the rectifiers and permits the amplifier to be operated with higher gain.

In the operation of the phase and amplitude modulator, an amplitude control signal is applied to the amplitude control windings, a phase control signal is applied to the phase control windings, and a fixed voltage is applied to the bias control windings. The bias voltage is selected to partially saturate the cores and thus determine the operating range of the modulator. A. C. voltages from the power source are connected to leads 144 and 146. The degree of saturation of the cores caused by the signals in the amplitude control windings determines the amplitude of the output across resistors 110 and 112. The phase of the output voltage is also controlled due to the push-pull action of the phase control winding.

Every voltage in the computer will be filtered by a unit identical with filter 115 so that the relative phase of all voltages will be identical if the phase shifts in the filters are disregarded.

A magnetic amplifier can in practice be considered a variable resistor. Eddy current and hysteresis losses in the cores of the amplifier are small enough to make this approximation acceptable. Two currents will flow in resistor 114, each of which is controlled by a magnetic amplifier. They are approximately in phase with the source voltages supplied by leads 144 and 146. These phases are at quadrature. Resistors 110 and 112 are used to isolate the magnetic amplifiers from each other. The voltage across resistor 114 is the sum of the voltages produced by the two quadrature currents. It is apparent, then, that both phase and amplitude of the output voltage can be controlled. In practice, a phase detector is usually placed on the phase control, for example as shown in the Fig. 4 circuit, to keep the output voltage precisely at quadrature with a reference voltage. This quadrature relationship can be maintained for reasonable reactance loading regardless of the fact that quadrature currents may be flowing through the output of the modulator due to other voltage sources.

Figure 4:
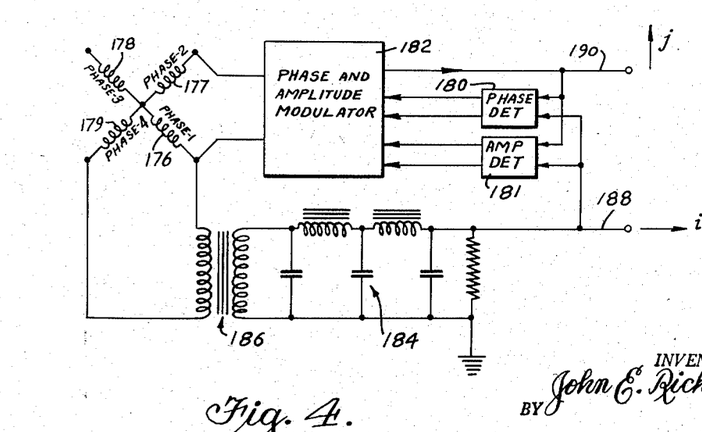
Fig. 4 is a schematic diagram of a regulated source of reference voltages.

Fig. 4 illustrates schematically a regulated, two phase, harmonic free, reference voltage source comprising a raw four-phase voltage supply with branches 176, 177, 178, and 179 representing separate phases, and previously described elements including a phase detector 180 of the type shown in Fig. 1, an amplitude detector 181 of the type shown in Fig. 2, a phase and amplitude modulator 182 of the type shown in Fig. 3, a filter 184 equivalent to filter 115 of Fig. 3, a transformer 186, and leads 188 and 190 for tapping off the desired reference voltages. The raw power source may be any four phase system known to the art. A source having a frequency of 400 cycles per second has been found to be very satisfactory. It is desirable that the supply be voltage regulated although the regulation may be done in the computer. Each voltage in the supply is either at quadrature or out of phase with each of the others, and all voltages are at the same frequency. Departures of ±10 degrees for the phase relationships are permissible. No stringent requirements are demanded of the raw power supply other than that it be able to deliver the power required. Since one source furnishes the entire power for the computer it will be necessary to have approximately 50 volts on each phase to operate the magnetic amplifiers. In general, it is desirable to have reference voltages much lower, usually about 10 volts. From the four phase supply a master phase is derived by which the phase of every voltage in the computer is directly or indirectly controlled. The master phase is obtained by adding phase 1 and phase 4 from branches 176 and 179 respectively by means of step-down transformer 186, and filtering the output. Since the filter is identical with the type shown in the output of the phase and amplitude modulator, the phase shift in the filter may be disregarded. The master phase delivered by lead 188 corresponds to the unit vector $i$. Its direction will correspond to the direction of the $x$-axis and its magnitude will correspond to the scale or units in which the $x$—$y$ plane is to be measured. The voltage corresponding to $j$, which is made available at terminal 190, is obtained by means of phase and amplitude modulator 182, which combines phase 1 and phase 2 from branches 176 and 177 respectively of the raw power supply. Through the use of phase detector 180 and amplitude detector 181, $j$ is maintained at quadrature to $i$ and is regulated to have the same amplitude.

Fig. 5 shows an ellipse of the equation $$b^2x^2 + a^2y^2 = a^2b^2$$

Many curves have geometrical relationships which are easy to establish. These curves in many cases have functional relationships between variables which are directly applicable to analogue computing. The properties of conic sections may be employed to solve a wide variety of problems. In the ellipse shown, A is located at the point $(x, y)$. C and B are located at the foci $[-(a^2-b^2)^{1/2},0]$ and $[a^2-b^2)^{1/2},0]$ respectively. According to the geometric properties of an ellipse, $$AC+AB=2a$$
$$CA=/i(a^2-b^2)^{1/2}+\bar{R}/$$
$$BA=/-i(a^2-b^2)^{1/2}+\bar{R}/$$

Since $\bar{R}$ may be represented by $ix+jy$, and $(a^2-b^2)^{1/2}$ may then be represented by $d$, then $$/ix+jy+id/+/ix+jy-id/-2a=e,\ e\to 0$$

It will be noted that, as point $(x, y)$ passes from one quadrant to the next, $e$ changes sign, being ambiguous or indeterminate at the moment of transition. However, within any quadrant $e$ is a monotonic function of either $x$ or $y$, so the cell will operate within a quadrant.

Figure 6:
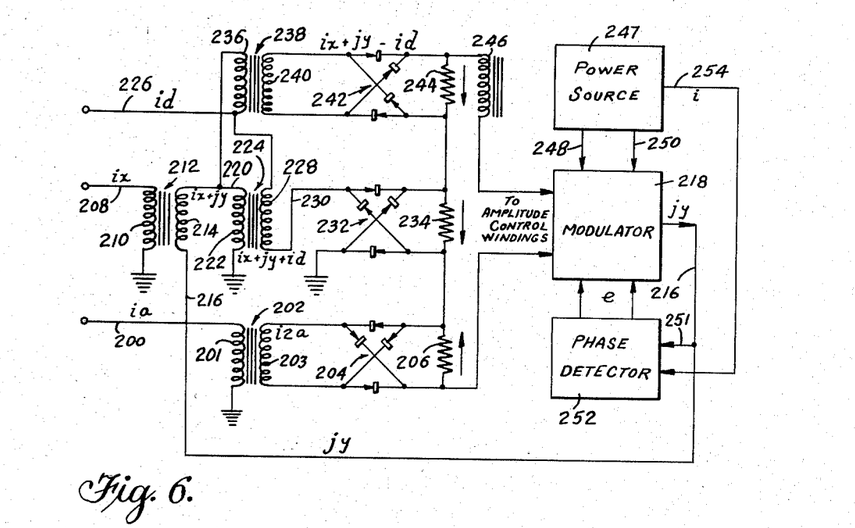
Fig. 6 is a schematic diagram of a suitable instrumentation for solving the ellipse of Fig. 5.

Fig. 6 shows schematically an instrumentation for the ellipse of Fig. 5. It is understood that two unit sinusoidal voltages at quadrature, namely $i$ and $j$, exist, and that all voltages used are considered as vectors and can be made from quadrature voltages which are in phase with $i$ and $j$. Lead 200 provides means for connecting primary 201 of transformer 202 to an external voltage source. The voltage from secondary 203 is rectified in rectifier bridge 204 and impressed across resistor 206. Lead 208 provides means for connecting primary 210 of transformer 212 to an external voltage source. Secondary 214 of transformer 212 is connected through lead 216 to the output of modulator 218 and through lead 220 to primary 222 of transformer 224. Lead 226 connects an external voltage source to one terminal of secondary 228 of transformer 224. The other terminal of transformer secondary 228 is connected through lead 230 to rectifier bridge 232. The output of rectifier bridge 232 is impressed across resistor 234. Primary 236 of transformer 238 is connected across leads 220 and 226. The output of secondary 240 is rectified in rectifier bridge 242 and impressed across resistor 244. Resistors 206, 234, and 244 are connected in series through inductor 246 to the amplitude control windings of modulator 218. Power is supplied to modulator 218 from source 247 through leads 248 and 250. The output of modulator 218 connected through lead 251 is compared with a reference voltage $i$ from power source 247 in phase detector 252. Lead 254 serves to connect power source 247 to phase detector 252.

In the operation of the above described device, a voltage $ia$, which establishes one-half of the major axis, is fed into transformer 202 where it is stepped up to $2ia$ to represent $2a$, the major axis. The stepped up voltage is rectified in rectifier bridge 204 and impressed across resistor 206. The known variable is taken to be $x$ so a voltage $ix$ is made available as an input to the cell. The voltage $ix$ is added to voltage $jy$ in transformer 212. To the sum of $ix$ and $jy$, the voltage $id$, which establishes the foci of the ellipse, may be added in transformer 224 and the net voltage is rectified and impressed across resistor 234. Voltage $id$ is subtracted from the sum of $ix$ and $jy$ in transformer 238, and this net voltage is impressed across resistor 244 after rectification in rectifier bridge 242. The rectified voltages $/ix+jy-id/$ and $/ix+jy+id/$ across resistors 244 and 234 respectively are added together and the rectified voltage $2ia$ across resistor 206 is compared with the sum of the two voltages across resistors 244 and 234. If the voltages do not cancel completely, an error voltage $e$ results which is effective to control the output voltage $jy$ of modulator 218 in such a way that the error voltage $e$ will approach zero. The function of phase detector 252 is to ensure that the modulator output voltage $jy$ is at quadrature to the master phase reference voltage. The voltages $id$, $ix$ and $ia$ may be obtained from the master power source by using potentiometers or they may come from other sources such as separate computer cells. The described method of combining and comparing voltages discloses that only one quadrant of an ellipse may be used for computing with any one particular wiring arrangement, because the error voltage will approach infinity instead of approaching zero when the polarity of the input voltages is reversed, and the apparatus will cease to function. By reversing leads to the various transformers for changes in input voltage, it is possible to make use of all four quadrants.

A hyperbola having the equation $b^2x^2-a^2y^2=a^2b^2$ may be instrumented in the same manner as for the above described ellipse since the mere difference in sign between equations of an ellipse and a hyperbola can be handled by reversing the leads to transformer windings. The hyperbola equation, for instrumentation purposes, reduces to $$/ix+jy+i(a^2+b^2)^{1/2}/-/ix+jy-i(a^2+b^2)^{1/2}/-2a=e,\ e\to 0$$

A large number of functions can be generated by representing them approximately with curves whose geometric properties are easy to instrument. The Cartesian ovals are complicated enough in structure that portions of them can be used to approximate many functions. These curves are in special cases conic sections. They are formed by a point which moves on a curve in such a manner that its distances $L_1$ and $L_2$ from two fixed points satisfy the relation $L_1+mL_2=n$, where $m$ and $n$ are constants. If the fixed points or foci are placed symmetrically to the origin at the points $(-a, 0)$, and $(a, 0)$ then the equation of the curve is $$[x^2+y^2+a^2)(1-m^2)+2ax(1+m^2)-n^2]^2-$$
$$4m^2n^2(x^2+y^2+a^2)+8m^2n^2xa=0$$

The method of instrumentation is identical to that of an ellipse except $L_2$ is multiplied by $m$ with a transformer having a ratio of $m$ between secondary and primary.

A cell making use of the properties of the parabola shown in Fig. 7 may be desired in some cases, for example, to produce a voltage magnitude equal to the square root of the magnitude of a second arbitrary voltage. A point on a parabola is always an equal distance from its focus and directrix. If this geometric relationship is held, the terminus of $\bar{R}$ lies always on a parabola. The parabola shown is of the form $y^2=4kx$. A is the point $(x,y)$, B is a point on the directrix, and C is at the focus. Hence $AB=AC$. In a cell the input and output voltages are always available. The input voltages are $ik$ and $ix$; the output voltage is $jy$. Now, $$AB=/i(x+k)/\text{ and }AC=/R-ik/$$

Then, $$/i(x+k)/-/ix+jy-ik/=e,\ e\to 0$$

The last equality is in the form $/\overline{S}/-/\overline{T}/=e,\ e\to 0$, and the cell may readily be instrumented, by means as later described, since only one such equation is necessary. An examination of the equations reveals that $y$ may be chosen to take either positive or negative values but not zero. Hence, $y=\pm(4k)^{1/2}\cdot(x)^{1/2}$ where $(4k)^{1/2}$ is a scaling factor. It is not necessary for $k$ to be a constant and it is possible to interchange the roles of $x$ and $y$ as independent and dependent variables.

Conic sections other than parabolas may be generated by moving the point $(x, y)$ so that the ratio of its distance from a fixed line and a fixed point is always equal to a constant, here termed $\epsilon$, the eccentricity of the conic. This method has the advantage that a cell so formed can operate over a larger region than some of the cells previously described. For example, assume that one directrix lies parallel to the $y$-axis and has the equation $x=a$ and that a focus lies on the $x$-axis at $x=b$. If a line AC from the point $(x, y)$ to the directrix is parallel to the $x$-axis, and the line AB is the distance from the point $(x, y)$ to the focus, then $(AC)\epsilon=AB$. The multiplication of AC is easily obtained by using a transformer which has a primary-to-secondary ratio equal to $\epsilon$. It is also possible to use the above mentioned methods and apparatus in conjunction with purely mathematical analyses to solve the general second degree equation, in $x$ and $y$, of $Ax^2+Bxy+Cy^2+Dx+Ey+F=0$.

Figure 8:
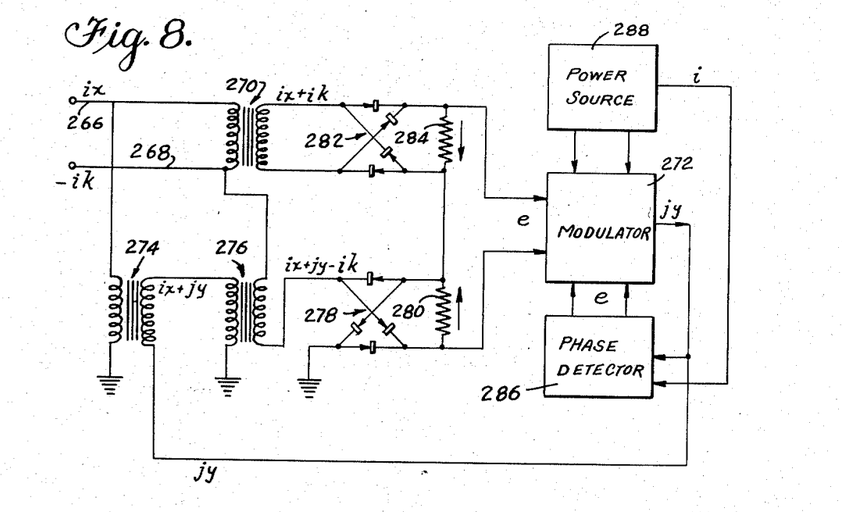
Fig. 8 is a diagram of an instrumentation for solving the parabola of Fig. 7.

The instrumentation of the parabola of Fig. 7 is shown in Fig. 8. Input voltages $ix$ and $-ik$ from external sources through leads 266 and 268 are combined in transformer 270. Voltages $ix$ and $jy$ from lead 266 and the output of modulator 272 respectively are combined in the secondary of transformer 274. Voltage $ik$ is subtracted from the voltages $ix+jy$ in transformer 276. The output voltage of transformer 276 is rectified in rectifier bridge 278 and impressed across resistor 280. The output voltage of transformer 270 is rectified in rectifier bridge 282 and impressed across resistor 284. The voltages across resistors 280 and 284 are compared; if they are not equal, modulator 272 controls output voltage $jy$ in such a manner that the voltages across the two resistors are made equal. Phase detector 286 ensures that modulator output $jy$ is at quadrature with the master phase voltage $i$ of power source 288. The method of operation is similar to the method described in connection with the instrumentation of the ellipse.

Figures 9, 10:
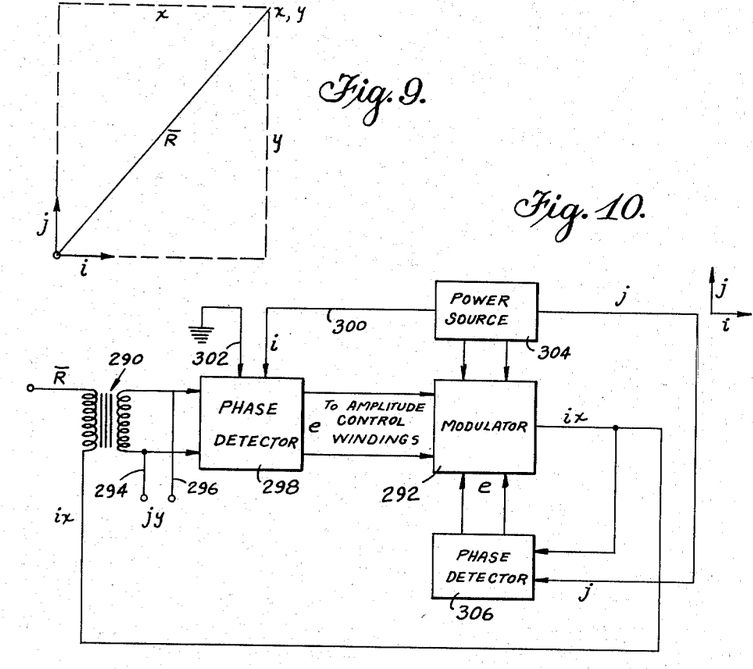
Fig. 9 is a vector diagram showing a vector resolved into its components.
Fig. 10 is a schematic diagram of a resolver.

Fig. 9 shows the vector $\bar{R}$ being resolved into its components in a frame of reference designated by the unit quadrature voltages $i$ and $j$. It is seen that $\bar{R}-ix=jy$. Hence, $(\bar{R}-ix)\cdot i=0$. This is the equation for $\bar{S}\cdot\bar{T}=e$, $e\to 0$, where $\bar{S}=\bar{R}-ix$ and $T=i$, and a cell to resolve the vector can be set up. In this case, $e$ is a monotonic function of $x$. This cell has two outputs, namely $ix$ and $jy$. Only one vector is needed to specify a reference frame provided it is understood that the vector lies parallel to the $x$-axis, and the $y$-axis is to be displaced by a 90 degree rotation counterclockwise. Attention is called to the fact that only the sense and not the magnitude of a vector representing a reference frame is important when the vector is used to resolve an arbitrary vector in the reference frame.

The instrumentation of the resolver of Fig. 10 includes transformer 290 in which the voltage corresponding to vector $\bar{R}$ to be resolved is combined with a voltage $ix$ which is an output of modulator 292. Since $\bar{R}-ix=jy$, the voltage induced across the secondary of transformer 290 is equal to $jy$ and is made available by means of leads 294 and 296. The phase of the combined voltage representing $\bar{R}-ix$ is compared with the master phase voltage $i$ in phase detector 298. Leads 300 and 302 serve to connect power source 304 to the phase detector. The output D. C. error voltage of phase detector 298 is fed into amplitude control windings of modulator 292 since the relative amplitudes of voltages $ix$ and $jy$ control the phase of the resultant when they are combined. Phase detector 306 is in the circuit to ensure that the output voltage $ix$ will be at quadrature with reference voltage $j$ which represents one axis of the reference frame.

Figure 11:
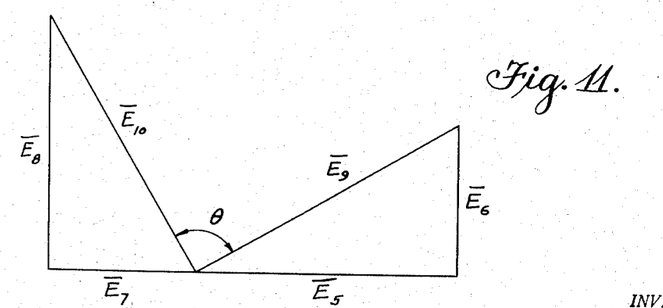
Fig. 11 is a vector diagram illustrating the operation of a multiplier.

Fig. 11 illustrates the method of obtaining products, quotients, roots and powers through the use of a computer cell. Vector quantity $\bar{E}_9$ is the sum of vectors $\bar{E}_5$ and $\bar{E}_6$. Similarly, vector $\bar{E}_{10}$ is the sum of vectors $\bar{E}_7$ and $\bar{E}_8$. If right angles are formed between vectors $\bar{E}_5$ and $\bar{E}_6$, $\bar{E}_7$ and $\bar{E}_8$, and $\bar{E}_9$ and $\bar{E}_{10}$ (angle $\theta$), then the two triangles formed are similar and vector $\bar{E}_9$ corresponds to vector $\bar{E}_{10}$, vector $\bar{E}_5$ corresponds to vector $\bar{E}_8$, and vector $\bar{E}_6$ corresponds to vector $\bar{E}_7$. Vector $\bar{E}_5$ may be represented by a voltage $E_5$, vector $\bar{E}_6$ may be represented by a voltage $E_6$ at quadrature to voltage $E_5$, vector $\bar{E}_7$ may be represented by a voltage $E_7$ which is 180° out of phase with $E_5$, and vector $\bar{E}_8$ may be represented by a voltage $E_8$ at quadrature to voltage $E_7$. Voltages $E_5$ and $E_6$ combined product voltage $\bar{E}_9$, and voltages $E_7$ and $E_8$ combined produce voltage $E_{10}$. Vector $\bar{E}_{10}$, represented by $\bar{S}$, is equal to $jE_2-iE_7$. Vector $\bar{E}_9$, represented by $\bar{T}$, is equal to $iE_5+jE_6$. If $\bar{S}\cdot\bar{T}=e$, $e\to 0$, then similar triangles exist and the relationship $$\frac{E_8}{E_7}=\frac{E_5}{E_6}$$

is established. For any given values of three voltages of the equation, the remaining voltage must be fixed and determinable. A method is thus provided for continuously solving the equation $$E_8=E_7\frac{E_5}{E_6}$$

It is obvious that squares and square roots may be readily solved by the same relationship since they are special cases of the general equation. For example, if $E_7$ and $E_5$ are made equal, then $$E_8=\frac{E_5^2}{E_6}$$

Similarly, if $E_8$ is made equal to $E_6$ the equation becomes $E_6^2=E_7E_5$, and by holding $E_5$ constant and varying $E_7$, the equation becomes $E_6=K\sqrt{E_7}$.

Figure 12:
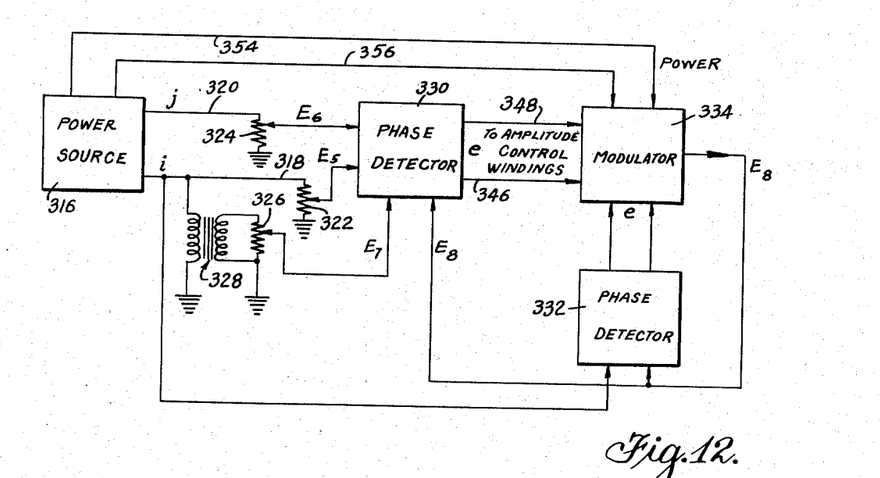
Fig. 12 is a schematic diagram of a multiplier circuit.

A schematic diagram of a suitable apparatus for performing the operations described in connection with Fig. 11 is shown in Fig. 12. Power source 316, which may be of the form shown in Fig. 4, furnishes reference voltages through lead 318 which is connected to the master phase and lead 320, which is connected to the quadrature phase. Voltages corresponding to $E_5$, $E_6$, and $E_7$ of Fig. 11 are respectively shown as being taken from the reference voltages by means of potentiometer 322, potentiometer 324, and potentiometer 326 in conjunction with transformer 328, respectively. The input voltages for the multiplier may, however, be output voltages from other cells. The fourth input voltage, corresponding to $E_8$, which represents the desired answer, comes from within the apparatus. Phase detectors 330 and 332 may conveniently be of the form shown in Fig. 1, and the phase and amplitude modulator 334 may be of the type shown in Fig. 3. Leads 346 and 348 provide a current path for error voltage input to phase and amplitude modulator 334. Power input to the modulator from power source 316 is through leads 354 and 356.

In the operation of the above described multiplier, a master phase voltage $E_5$ of desired amplitude is tapped off potentiometer 322 and combined, in phase detector 330, with a quadrature voltage $E_6$ of any desired amplitude to produce a resultant voltage $E_9$. From potentiometer 326, voltage $E_7$ of any desired amplitude is obtained. Voltage $E_7$ is 180° out of phase with master phase voltage $E_5$ due to the action of transformer 328. Voltage $E_7$ is combined with the output voltage of phase and amplitude modulator 334 to produce resultant voltage $E_{10}$. The phase relationships of the two resultant voltages $E_{10}$ and $E_9$ are compared in phase detector 330. If the two resultant voltages are not at quadrature, a D. C. error voltage proportional in amplitude to the departure from quadrature is produced. This error voltage is effective when applied to modulator 334, to control the magnitude of $E_8$ so as to preserve quadrature between $E_9$ and $E_{10}$ at all times. When quadrature is thus maintained, voltage $E_8$ is maintained so as to satisfy the equation $$E_8=E_7\frac{E_5}{E_6}$$

Phase detector 332 ensures that voltage $E_8$ is mantained at quadrature with voltage $E_7$.

The accuracy of the computer as a multiplier is indicated by the table of representative data. The average error of many determinations was 0.8% (.08 volt) where the full scale output is 10 volts. Data taken on the device as used to compute root shows an average error of less than 0.3%.

$$\frac{E_8}{E_6}=\frac{E_5}{E_6} \text{ or } E_8=\frac{E_5 E_7}{E_6}$$

| $E_5$ volts | $E_6$ volts | $E_7$ volts | $E_8$ volts | Percent error full scale |
|---|---|---|---|---|
| 8 | 8 | 8 | 7.95 | −0.5 |
| 6 | 8 | 4 | 3.05 | +0.5 |
| 6 | 4 | 4 | 6.15 | +1.5 |
| 3 | 8 | 8 | 2.97 | −0.3 |

$$E_8=\sqrt{E_5 E_7}\ (E_8=E_6)$$

| $E_5$ | $E_7$ | $E_8$ (measured) | $E$ computed | Percent error full scale |
|---|---|---|---|---|
| 8 | 8 | 7.95 | 8 | −0.5 |
| 4 | 4 | 4.00 | 4 | 0.0 |
| 2 | 2 | 1.95 | 2 | −0.5 |
| 4 | 6 | 4.88 | 4.9 | −0.2 |
| 8 | 2 | 4.00 | 4.0 | 0.0 |

Figure 13:
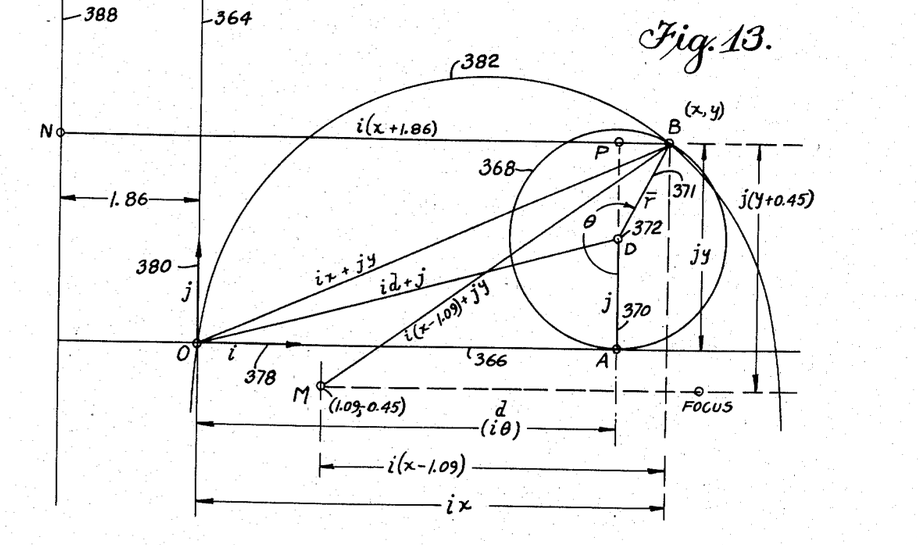
Fig. 13 is a diagram illustrating properties of a cycloid suitable for computing purposes.

Fig. 13 illustrates the problem involved in the generation of transcendental functions which is basically the problem of angular measurement. Since the measurement of an angle is essentially the measurement of the length of an arc, it is apparent that the representation of an angle by a voltage in which a linear relationship exists between the two is not a simple problem. However, once such a relationship is established it is a relatively simple matter to generate the trigonometric, hyperbolic, and exponential functions.

Ordinate 364 and abscissa 366 specify $y$ and $x$ axes with the origin at O. Circle 368 having radii 370 and 371, center point 372 designated by D, and a fixed point on the circumference designated as B, moves along abscissa 366. Unit reference vectors 378 and 380 have amplitudes $i$ and $j$ as indicated. As circle 368 is rolled along the $x$-axis, point B generates a cycloid which is that part of curve 382 above the $x$-axis. The parametric equations of a cycloid in terms of $\theta$, the angle through which circle 368 rotates, are $x=r(\theta-\sin\theta)$ and $y=r(1-\cos\theta)$ in which $r$ is the radius of the circle. If a circle of unit radius (radius 370 equal in magnitude to vector 378) is used to generate the cycloid, the parametric equations reduce to $x=\theta-\sin\theta$ and $y=1-\cos\theta$.

By using the properties of a cycloid, a perfect linear relationship can be maintained between the varying magnitude of a vector with fixed orientation and the corresponding variation in the angular displacement of a vector of constant magnitude. The coordinate system is chosen with origin O at one node of cycloid 382. Let B denote any point $(x, y)$ on the cycloid. The generating circle can be sketched for this instant; its center is at D and A is the point of tangency of the circle and the $x$-axis. The equation $DA=DB=1$ expresses the relation between these points. The distance OA is equal in magnitude to the angular displacement in radians, $\theta$, of the line DB. Two conditions are needed for this relationship to hold, namely, the point B must lie on both the cycloid and the circumference of the generating circle. The last condition implies that $DA=DB$.

Unfortunately, no geometric properties of the cycloid have been found which can readily be used to generate it. Consequently, for computation purposes, an ellipse is substituted for the cycloid. An ellipse is used in which the major and minor axes have been adjusted and the center located relative to directrix 388 so that one arch of a cycloid is closely approximated. This approximation leads to a very small error.

Let the equation for the ellipse be $$\frac{(x-\pi)^2}{a^2}+\frac{(y-c)^2}{b^2}=1 \text{ or } x=\pi\pm\frac{a}{b}[b^2-(y-c)^2]^{\frac{1}{2}}$$

The problem is to equate DB to DA and solve for OA. The parameters of the ellipse, namely, $a$, $b$, and $c$ are adjusted so that the magnitude of OA is approximately equal to the angular displacement of DB as expressed in radians.

Let $OA=d$ and $DA=DB=1$, then $x=d-\sin\theta$ and $y=1-\cos\theta$.

The values of $a$, $b$ and $c$ are chosen so that the ellipse will coincide with the cycloid at the points for which $\theta=0, \pi, 2\pi$. That is, $y=O$ when $x=O$ or $2\pi$, and $b+c=2$. It was found that for proper choice of $c(-0.45)$, the third condition introduces a maximum error of approximately 1 degree when $\theta$ is 90 degrees.

If $y=O$ and $x=O$ or $2\pi$, then $$\pi=\frac{a}{b}(b^2-c^2)^{\frac{1}{2}} \text{ or } a=\pi\left(\frac{b^2}{b^2-c^2}\right)^{\frac{1}{2}}$$

If, in addition, $b+c=2$ and $c=-0.45$, then $$x=\pi\pm\pi\left[1-\frac{y^2-2cy}{4(1-c)}\right]^{\frac{1}{2}}$$

The constants of the ellipse are $a=3.20$, $b=2.45$, and $c=-0.45$. The eccentricity $$\frac{MB}{NB}$$

of the ellipse is 0.64. Now, $$y=1-\cos\theta=2\sin^2\left(\frac{\theta}{2}\right)$$

and $x=d-\sin\theta$ so that $d=\sin\theta+\pi+\pi$ $$\left[1-\frac{\sin^4\left(\frac{\theta}{2}\right)-c\sin^2\left(\frac{\theta}{2}\right)}{1-c}\right]^{\frac{1}{2}}$$

An instrumentation of the ellipse and the generating circle will produce a vector of constant magnitude whose angular displacement is linearly related to the magnitude of a vector of fixed orientation. This constant amplitude, rotating vector which has the value $i\sin\theta+j\cos\theta$ is particularly useful as an input to other computer cells. Two additional vectors are also generated which have fixed orientation but whose magnitudes vary as the $\sin\theta$ and $\cos\theta$. These vectors are obtained from the parametric equations of the cycloid $$\sin\theta=d-x$$

$$\cos\theta=1-y$$

These trigonometric functions are available through a range of 0 to $2\pi$ radians. It will be noticed that they have the proper sign throughout this range. For any value of $x$, $y$ can be controlled so that B is always on the ellipse. Then $x$ can be controlled so that $DB=DA$. The independent variable is $d$ (line OA).

Let the line DB be represented by the vector $\bar{r}$. If $DA=1$, then $/\bar{r}/=1$. One method of controlling $x$ and $y$ so that $/\bar{r}/=1$ and point $(x, y)$ will be constrained to the circle is to establish a relationship between line OB which is the quantity $ix+jy$ and line OD which is the quantity $id+j$. Then $$\bar{r}=(ix+jy)-(id+j)=i(x-d)+j(y-1)$$

and $\bar{r}$ is equal to DA if $$i(x-d)+j(y-1)-/j/=O$$

since $j$ is of unit magnitude. This expression is of the form $/S/-/T/=e$, $e\to O$, where $e$ is a monotonic function of $x$ except at the point corresponding to $\theta=\pi$, where $e$ is ambiguous. The point $\theta=\pi$ should be avoided. However, it causes no trouble if excursions are made through it for types of operation such as phase modulation. The point $(x, y)$ will be constrained to move on the ellipse by using a directrix and a focus. The directrix is represented by a line parallel to the $y$-axis and intercepting the $x$-axis at the point $(-1.86, 0)$. The focus at point M utilized for control is located at the point $(1.09, -0.45)$. The point $(x, y)$ moves on the ellipse provided $$/i(x+1.86)/ - \frac{1}{0.64}/i(x-1.09)+j(y+0.45)/ = e, e \to 0$$

Line OA has been represented by the symbol $d$ in the foregoing explanation to simplify the analysis. It will be evident from a consideration of the properties of a cycloid that line OA may be represented, in terms of the angle $\theta$, by the expression $i\theta$ in which $i$ establishes the direction of the vector and $\theta$ denotes vector magnitude which is proportional to the angle through which the rotating vector $\bar{r}$ has turned. The distance from point B to point P is then $ix-i\theta$, or $i(x-\theta)$, but this length is simply $i \sin \theta$ as is demonstrated by the relationships of the right angle triangle DPB. Similarly, the distance from point D to point P is $j(y-1)$ which is $j \cos \theta$. The parametric equations of the cycloid may be written in the form $$i \sin \theta = i(\theta-x)$$
$$j \cos \theta = j(1-y)$$

and the signs of the values of the functions change as $i\theta$ becomes greater than or less than the value of $x$ for the point $(x, y)$.

It is obvious that the circuit component producing $i\theta$ can be calibrated to read directly in degrees. If $\bar{r}$ is made to coincide with an arbitrary vector, the orientation of the vector can be read directly. Instrumentation can be done so that $\theta$ can be read in respect to any given reference. It is not necessary to control the voltage for $i\theta$ manually in order to find the phase of an arbitrary vector, $\bar{P}$. Instead, the relationship $\bar{P} \cdot \bar{r} = e, e \to 0$ can be used in which $e$ is made a monotonic function of $i\theta$. The orientation of $\bar{P}$ is read directly, allowing for the quadrature relationship of the two vectors.

Figure 14:
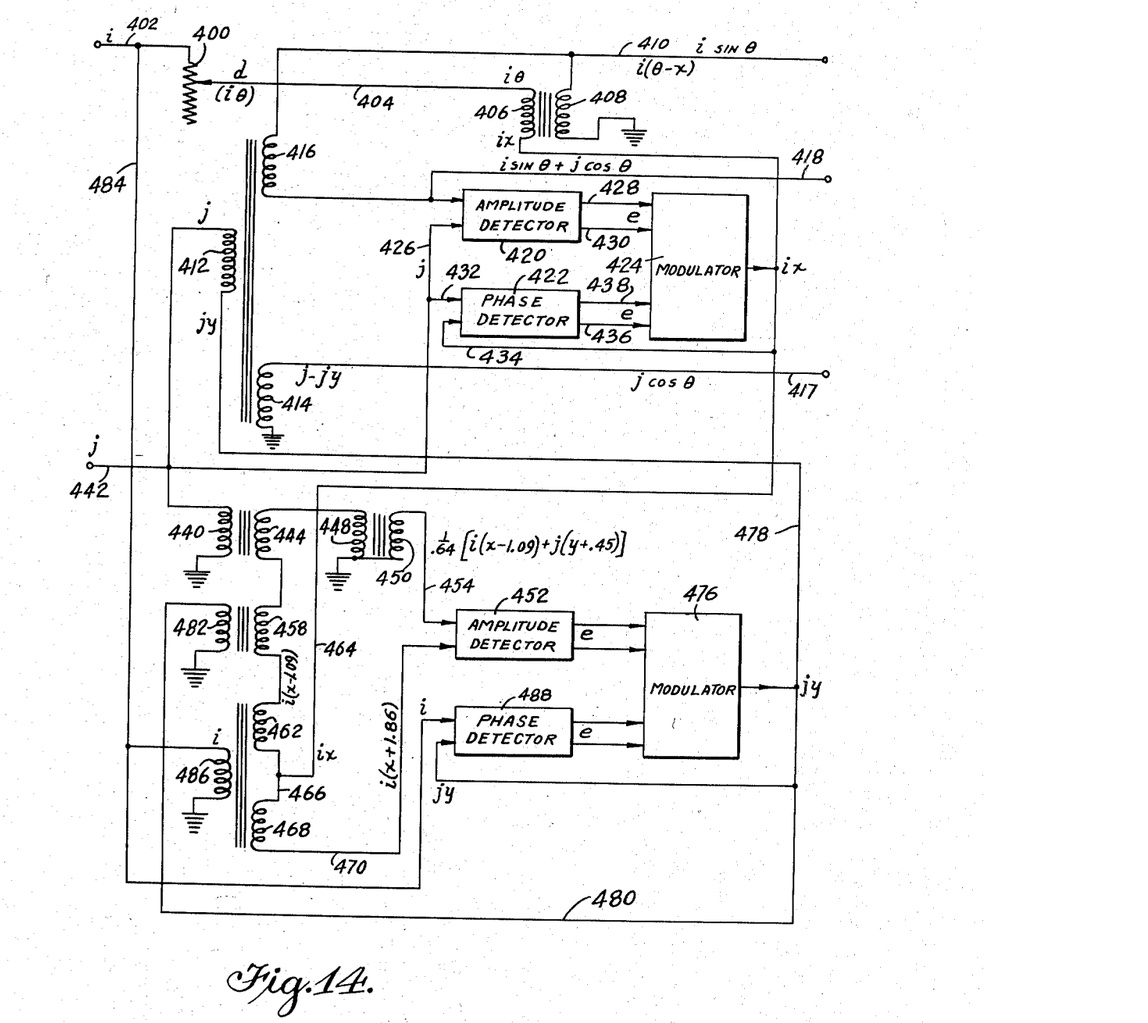
Fig. 14 is a schematic diagram of a computer element for developing trigonometric functions.

The circuit shown in Fig. 14 for the instrumentation of the trigonometric functions includes potentiometer 400 having an input lead 402 and output lead 404 which connects the potentiometer to primary winding 406 which is associated with secondary winding 408. One end of secondary 408 is grounded and the other end is connected to lead 410. Primary winding 412 has two associated secondary windings 414 and 416. Lead 417 serves to make the voltage across winding 414 available as an output, and lead 418 serves to make the voltage in winding 416 available as an output. Amplitude detectors 420 and 452, phase detectors 422, and 488, and modulators 424 and 476 are of the type previously described. The power supply to the modulators is not shown. Primary winding 440 is connected between ground and input lead 442 while secondary winding 444 is connected to primary winding 448. The output of secondary winding 450 is connected to amplitude detector 452 by means of lead 454. Winding 444 is connected to winding 458 which in turn is connected to secondary winding 462. Lead 464 connects the output of modulator 424 to windings 462 and 468 which are joined by means of lead 466. Winding 468 is connected to one input terminal of amplitude detector 452. The output of modulator 476 goes via lead 478 to winding 412 and via lead 480 to winding 482. Lead 484 which joins lead 402 is connected to winding 486 and to phase detector 488. Phase detector 488 is also connected to lead 480, and the error output voltage goes to phase control windings of modulator 476.

In the operation of the above described circuit, modulator 424 maintains point $(x, y)$ on the circle and modulator 476 maintains the point on the ellipse. Voltage $ix$, created within the apparatus as will hereinafter be explained, is combined in windings 468 and 486 acting as a transformer with voltage $i$ which is made available through lead 484. The turns ratio of the transformer consisting of windings 468 and 486 is such that a voltage corresponding to $i(x+1.86)$, the distance from the directrix to the point $(x, y)$, is delivered via lead 470 to amplitude detector 452. In windings 486 and 462, voltage $i$ is transformed to $-1.09i$ and combined with voltage $ix$ to produce $i(x-1.09)$. In windings 482 and 458, voltage $jy$ is added to $i(x-1.09)$ and in windings 440 and 444, $j0.45$ is also added making a total of $i(x-1.09)+j(y+.45)$. This value represents a distance from the focus to the point $(x, y)$ or line MB in Fig. 13. The voltage is then transformed in windings 448 and 450 which multiply the value by a factor related to the eccentricity of the ellipse. The eccentricity may be introduced by multiplying the distance from the focus to the point on the ellipse by the reciprocal of the eccentricity as is done here or by multiplying the distance from the point to the directrix by the eccentricity, which is less than unity for an ellipse. The resulting voltage $$\frac{1}{.64}[i(x-1.09)+j(y+.43)]$$

is then compared in phase detector 452 with the voltage $i(x+1.86)$. If the two voltages are not equal in magnitude, an error voltage is produced which returns point $(x, y)$ to the ellipse through the action of modulator 476. The output of modulator 476 is a voltage $jy$ which, in winding 482, exerts an influence on the voltage representing the length of line MB. Phase detector 488 is in the circuit to ensure that modulator output $jy$ is maintained at quadrature with respect to reference voltage $i$.

Winding 412 is effective to combine voltage $j$, and voltage $jy$, which is made available by means of lead 478. The combined voltage may be taken off winding 412 by means of secondary winding 414 as $j(1-y)$ is $j \cos \theta$ which is available for computing purposes at lead 417. The value of $jy$ is determined by the values of the reference voltages and by the various transformer turn ratios which are selected and which remain constant, and by $ix$ which varies as the independent variable is regulated. The independent variable, $i\theta$, is shown as derived from the reference voltage $i$ by means of potentiometer 400. The input voltage could be derived from another source such as, for example, a separate computing cell. In winding 406, voltage $i\theta$ is combined with the output voltage $ix$ of modulator 424; the connections to windings 406 and 408 are such that the value $i(\theta-x)$ is obtained. However, $i(\theta-x)$ is $i \sin \theta$ which is a desired output voltage. In winding 416, $j \cos \theta$ is obtained with $i \sin \theta$ added in. The value $i \sin \theta + j \cos \theta$ is connected as an output on lead 418 and is also fed into amplitude detector 420 because it represents line DB of Fig. 13, which must be controlled to have unit amplitude. Reference voltage $j$ is a convenient amplitude standard to compare with the value $i \sin \theta + j \cos \theta$ so it also is fed to amplitude detector 420. If the two voltages are not of equal amplitude, an error output voltage goes to modulator 424 which will vary the output voltage $ix$. Output voltage $ix$ will vary in amplitude in such a way as to reduce the error voltage going into modulator 424 to zero. This is done by changing conditions in that part of the circuit producing $jy$ which in turn influences voltages that feed into amplitude detector 420. Phase detector 422 is connected effective to maintain the phase of voltage $ix$ at quadrature with respect to reference voltage $j$.

The above described circuit with an input $ix$ of fixed phase and variable amplitude will produce an output, $i \sin \theta + j \cos \theta$, of fixed amplitude and variable phase. The output phase is proportional to the input amplitude. The circuit may be regarded as a linear phase modulator. Two voltages of fixed phase ($i$ and $j$) are also produced whose amplitudes are proportional to values of sine and cosine. In some cases it may be desirable to use values of $ix$ and $jy$; these values are outputs of the two modulators. For any value of $x$ on the ellipse, the corresponding value of $y$ may be obtained.

Figures 15, 16, 17:
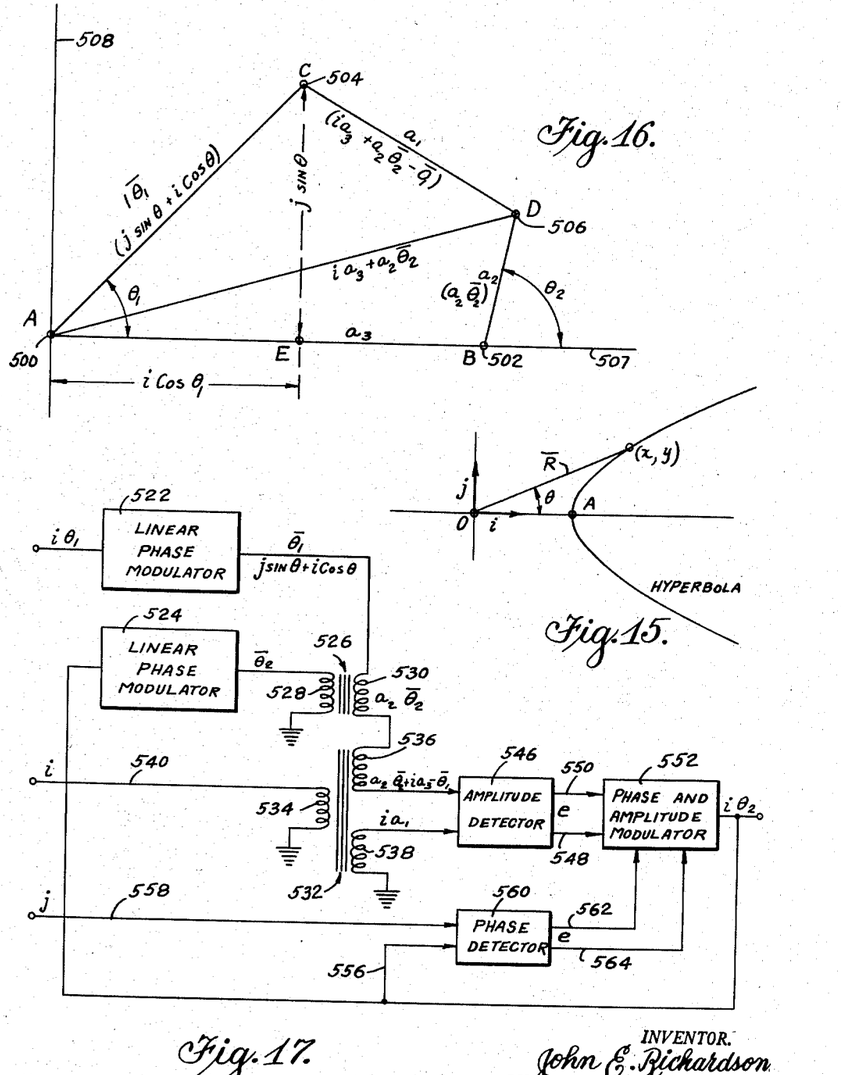
Fig. 15 is a diagram illustrating the generation of hyperbolic functions.
Fig. 16 is a schematic diagram of a three-bar linkage.
Fig. 17 is a schematic diagram of an electrical analogue of a mechanical three-bar linkage computer.

The hyperbolic functions are attached to the rectangular hyperbola in the same manner that the trigonometric functions or circular functions are attached to the circle. Fig. 15 shows the hyperbola $x^2-y^2=1$. Since $OA=1$, $x=\sinh\theta$ and $y=\cosh\theta$, where the angle $\theta$ is measured by the method described in the preceding discussion. If $\bar{R}$ does not have the desired orientation the measured angle $\theta$ will cause an error voltage to be produced which will will vary $x$. A second control will vary $y$ so that the point $(x, y)$ always lies on the hyperbola. The voltages $\sinh\theta$ and $\cosh\theta$ are at quadrature. A multiplier has been described in which the properties of similar triangles were used. This multiplier can be used so that one of the voltages can be brought into phase with the other and be unchanged in magnitude. The resulting voltages will add, giving a resultant with a magnitude equal to the scalar sum of the magnitudes. By combining the hyperbolic functions, exponential functions are generated.

$$\cosh\theta-\sinh\theta=e^{-\theta}$$
$$\cosh\theta+\sinh\theta=e^{\theta}$$

A useful family of curves is the set of Cassinian curves. The curve is the locus of a point which moves so that the product of its distances $L_1$ and $L_2$ from two fixed points is a constant, $k$. The equation of the curves, provided the fixed points are located at $(-a, O)$ and $(a, O)$, is:

$$[(x+a)^2+y^2][(x-a)^2+y^2]=k^2$$

Since $L_1L_2=k$, or $$[/i(x+a)+jy/][/i(x-a)+jy/]=k$$

it follows that in order to use the multiplier, the vectors will have to be rotated with magnitude unchanged until they are parallel to either the $x$ or $y$ axis. This is done by using the equations $$/i(x+a)+jy/-/iL_1/=e_1,\ e_1\to O$$

and $$/i(x-a)+jy/-/iL_2/=e_2,\ e_2\to O$$

The variables $e_1$ and $e_2$ are monotonic functions of $L_1$ and $L_2$. The product is taken of $iL_1$ and $iL_2$, that is $/iL_1//iL_2/=k$.

Many functions are easier to generate in polar coordinates. A function should be generated in whichever coordinates are most easily adapted to the problem. The algebraic relationship of variables and parameters can be taken in either coordinate system. Generating a function in polar coordinates requires that both the algebraic and geometric properties of the curve be considered. The resulting product is a radius vector of magnitude $\rho$ and an angular displacement $\theta$. When the transcendental functions were discussed it was found that it is possible to represent the angular displacement, $\theta$, of a vector by a voltage, as well as to obtain vectors whose magnitudes are proportional to $\sin\theta$ and $\cos\theta$. The fact that these vectors are available will suggest the possibility of solving many equations of the form $\rho=f(\theta)$.

The limaçon of Pascal is an illustrative example. The polar equation of this curve is $\rho=2a\cos\theta+k$. The equation in Cartesian coordinates is:

$$(x^2+y^2-2ax)^2=k^2(x^2+y^2)$$

The voltage of $\cos\theta$ is generated and the voltage $i(2a\cos\theta+k)$ is easily obtained. The unit vector, $\bar{r}$, displaced from $i$ by the angle $\theta$, will be used to direct the vector $\bar{P}$. It will be simpler to satisfy the equation $\bar{\rho}\cdot\bar{r}=e$, $e\to O$ than to have $\bar{\rho}$ and $\bar{r}$ parallel. The resulting curve will be rotated in space by 90 degrees, but usually this fact will be acceptable.

Some polar curves can be generated by a process called inversion. In inversion the equation $\rho=f(\theta)$ would be replaced by $1/\rho'=kf(\theta)$, in which $k$ is a constant. The radius vectors of the two curves are so related that the product of their magnitudes is equal to a constant. The limaçon of Pascal above discussed is an inversion of a circle.

Fig. 16 shows the essentials of a cell commonly called a three-bar linkage which is one of the most valuable units used in mechanical computers. This cell is composed of fixed frame AB to which is pivoted crank AC at point 500 and crank BD at point 502. The two cranks are connected together by means of linkage bar CD at points 504 and 506. One crank serves as an input terminal and the other crank serves as an output terminal. By adjusting the lengths of the various bars, the relationship of the angular displacements $\theta_1$ and $\theta_2$, of the two cranks can be made to represent, approximately, the functional relationships found in many problems involving two variables. Combinations of these cells can be used to solve more complex problems, especially those involving three or more variables.

The linkage may be described by five independent parameters. These may be given explicitly as input range, output range, and three independent ratios of the sides of the quadrilateral formed by the linkage. It is obvious that $\theta_1$ and $\theta_2$ are not dependent on the over-all scale of the mechanism. The three-bar linkage problem may be divided into 32 distinct types, each of which has an infinity of solutions. A thorough discussion of mechanical three-bar linkages has been published by Svoboda, "Computing Mechanisms and Linkages," 1948, McGraw-Hill Co., New York, N. Y. The electrical analogue of the three-bar linkage problem is useful to facilitate the design of mechanical cells, and the analogue may be used to produce, electrically, functional relationships between voltages by simulating three-bar linkages of known design. The electrical analogue of the three-bar linkage cell requires that voltages correspond to bars in which the amplitude corresponds to the length of the bar and the phase corresponds to angular displacement. Each crank in the linkage will correspond to a rotating vector of constant amplitude or an electrical voltage of variable phase. The cranks AC and BD are generated by a linear phase modulator of the type described for use in generating trigonometric functions. In this modulator the angular displacement of a vector of constant magnitude is linearly related to the magnitude of a second vector of fixed orientation. To simplify matter the length of bar AC is taken equal to unity and $$a_1=\frac{CD}{AC}=CD,\ a_2=\frac{BD}{AC}=BD,\ \text{and}\ a_3=\frac{AB}{AC}=AB$$

For analogue computing purposes, line AB may be regarded as lying on the $x$-axis 507 of a reference frame with line 508 as the ordinate. The origin is at point A. The distance from point A to point E is $i\cos\theta_1$ and the distance from point C to point E is $j\sin\theta_1$. The vectorial sum of these two distances is line AC which may be expressed as $j\sin\theta_1+i\cos\theta_1$ and which is also represented as the vector $\bar{\theta}_1$. Similarly, line BD, which is $$j\sin\theta_2+i\cos\theta_2$$

may be presented as $a_2\bar{\theta}_2$. Line AB, a fixed parameter of constant length, may be represented as $ia_3$. By adding sides $a_2$ and $a_3$ vectorially, line AD is obtained which is $a_2\bar{\theta}_2+ia_3$, and, since the length of line AC is known, the length of line CD is seen to be $ia_3+a_2\bar{\theta}_2-\bar{\theta}_1$. However, the length of line CD is also a parameter and is fixed for any given cell so the quantity $ia_3+a\bar{\theta}_2-\bar{\theta}_1$ may be compared with a voltage of constant amplitude in order to maintain the desired relationship between the input and output voltages representing the angles $\theta_1$ and $\theta_2$ respectively.

The three-bar linkage instrumentation shown in Fig. 17 includes linear phase modulators 522 and 524 of the type previously described in connection with Figs. 13 and 14, transformer 526 having primary winding 528 and secondary winding 530, and transformer 532 having one primary winding 534 and two secondary windings 536 and 538. The secondary windings of transformer 532 are connected to amplitude detector 546. The error voltage output of amplitude detector 546 is connected through leads 548 and 550 to the amplitude control windings of modulator 552. The output of modulator 552 is returned to linear phase modulator 524. Leads 556 and 558 provide means for applying voltages $i\theta_2$ and $j$ respectively to phase detector 560. Leads 562 and 564 connect the error output voltage from phase detector 560 to the phase control windings of modulator 552. It will be understood that the linear phase modulators and the phase and amplitude modulator shown in block form are, in practice, provided with reference and power voltages.

In the operation of the above described device, a voltage $i\theta_1$ of variable amplitude and fixed phase $i$ is fed into linear phase modulator 522. The output of the modulator is voltage $\bar{\theta}_1$ representing a vector of unit magnitude and variable orientation ($j \sin \theta + i \cos \theta$). This vector corresponds to the output $i \sin \theta + j \cos \theta$ of the linear phase modulator previously described. The change in orientation is due to the fact that Fig. 16 has been rotated 90° in order to illustrate more clearly the operating principle of the three-bar linkage. The orientation does not cause difficulties in instrumentation. A voltage $i\theta_2$ originating within the apparatus, as will hereinafter be explained, is fed into linear modulator 524 and the output voltage corresponding to $\bar{\theta}_2$ is applied across primary winding 528. The ratio of turns in transformer 526 is such that the value $a_2\bar{\theta}_2$ is obtained across secondary 530. A reference voltage $i$ applied to winding 534 results in the production of voltage $ia_3$ across winding 536. The voltages are combined, when all transformer connections are properly made, in such a way that a voltage corresponding to the value $a_2\bar{\theta}_2 + ia_3 - \bar{\theta}_1$ is delivered to amplitude detector 546. A voltage corresponding to the length $a_1$ is utilized for maintaining desired relationships in the system by comparing the magnitude of the value $a_1$ with the magnitude of the value $a_2\bar{\theta} + ia_3 - \bar{\theta}_1$. Since only the amplitude of $a_1$ is of interest for comparison purposes, the phase of this voltage is immaterial. If the magnitudes of the two values being compared in amplitude detector 546 are not equal, an error voltage $e$ results. This error voltage is then made effective to cause the output voltage $i\theta_2$ of modulator 524 to vary in a direction which will reduce the error voltage to zero. Phase detector 560 ensures that the output voltage $i\theta_2$ of modulator 552 will be maintained at quadrature to the reference voltage $j$.

The components of the above described computer cells are sturdy, reliable, and have indefinite service life. The use of magnetic amplifiers and transformers allows the potting of practically the entire computer, and there are no moving parts except for the voltage source. The power dissipation is less than 100 watts for any of the cells described.

Obviously many modifications and variations of the present invention are possible in the light of the above teachings. It is therefore to be understood that within the scope of the appended claims the invention may be practiced otherwise than as specifically described.

What is claimed is:

1. A computer for solving the equation $$b^2x^2 + a^2y^2 = a^2b^2$$

comprising sources of A. C. voltages $i$, $y$, $ix$, $jy$, $ia$, $-2a$, and $i\sqrt{a^2-b^2}$ wherein $i$ is a reference voltage of unit magnitude, $j$ is a second reference voltage equal in magnitude to $i$ and at quadrature therewith, $x$ is a first variable, $y$ is a second variable, and $a$ and $b$ are parameters of said equation, means to vectorially combine voltages $ix$, $jy$, and $i\sqrt{a^2-b^2}$ to produce a first resultant, means to vectorially combine voltages $ix$, $jy$, and $-i\sqrt{a^2-b^2}$ to produce a second resultant, an amplitude detector connected to compare the vectorial sum of said first and second resultants with the voltage $-2a$ effective to produce a control voltage in response to amplitude variation between said sum voltage and said voltage $-2a$, and a modulator connected to receive said control voltage and to control at least one of said sources $ix$ and $jy$ effective in response to said control voltage to control the voltage of said one source to maintain equal amplitude between said sum voltage and voltage $-2a$.

2. A computer for solving the equation $$b^2x^2 - a^2y^2 = a^2b^2$$

comprising sources of A. C. voltages $i$, $y$, $ix$, $jy$, $ia$, $-2a$, and $i\sqrt{a^2-b^2}$ wherein $i$ is a reference voltage of unit magnitude, $j$ is a second reference voltage equal in magnitude to $i$ and at quadrature therewith, $x$ is a first variable, $y$ is a second variable, and $a$ and $b$ are parameters of said equation, means to vectorially combine voltages $ix$, $jy$, and $i\sqrt{a^2-b^2}$ to produce a first resultant, means to vectorially combine voltages $ix$, $jy$, and $-i\sqrt{a^2-b^2}$ to produce a second resultant, an amplitude detector connected to compare the vectorial difference of said first and second resultants with the voltage $-2a$ effective to produce a control voltage in response to amplitude variation between said difference voltage and said voltage $-2a$, and a modulator connected to receive said control voltage and to control at least one of said sources $ix$ and $jy$ effective in response to said control voltage to control the voltage of said one source to maintain equal amplitude between said difference voltage and voltage $-2a$.

3. A computer for solving the equation $y^2 = 4kx$ comprising sources of A. C. voltages $i$, $j$, $ix$, $jy$, and $ik$ wherein $i$ is a first reference voltage of unit magnitude, $j$ is a second reference voltage equal in magnitude to $i$ and at quadrature therewith, $x$ is a first variable, $y$ is a second variable, and $k$ is a constant, means to vectorially combine voltages $ix$ and $ik$ to produce a first resultant, means to combine voltages $ix$ and $jy$ and $-ik$ to produce a second resultant, a detector connected to compare said first resultant with said second resultant effective to produce a control voltage in response to amplitude variations between said resultants, and a modulator connected to receive said control voltage and in response thereto regulate at least one of said voltages $ix$ and $jy$ effective to maintain the amplitude of said first resultant equal to the amplitude of said second resultant.

4. A computer cell for resolving an A. C. voltage of arbitrary magnitude and phase representing a vector quantity in one plane into two quadrature voltages designating a reference frame comprising a source of voltages $i$, $j$, $ix$, $jy$, and $\bar{R}$ wherein $i$ and $j$ are unit quadrature references, and $\bar{R}$ is an electrical representation of a vector originating at the origin of said reference frame and terminating at point $(x,y)$, means to vectorially combine voltages $\bar{R}$ and $ix$, a detector connected to compare the voltage sum of $\bar{R}$ and $ix$ with voltage $i$ effective to produce a control voltage in response to deviation in quadrature relation between said voltage sum and voltage $i$, a modulator connected to receive said control voltage and in response thereto regulate at least one of said voltages $ix$ and $jy$ whereby the vectorial sum of $ix$ and $jy$ is $\bar{R}$, said modulator including first and second saturable cores, first and second amplitude control windings connected in series and surrounding said first and second cores respectively and effective when energized to saturate both cores in the same direction, first and second bias windings connected in series and surrounding said first and second cores respectively and effective when energized to saturate both cores in the same direction, first and second phase control windings connected in series and surrounding said first and second cores respectively and effective when energized to saturate said cores in opposing directions, first and second A. C. supply voltage windings surrounding said first and second cores respectively, a source of fixed voltage for bias, means for connecting said bias voltage source to said bias windings, means for connecting a voltage of *i* phase to one of said supply voltage windings, means for connecting a voltage of *j* phase to the other of said supply voltage windings, and means for connecting said control voltage to said amplitude control windings, a second phase detector connected effective to compare the output of said modulator with the reference voltage substantially at quadrature thereto and to produce a second control voltage in response to deviation in quadrature between said modulator output with the reference voltage, and means for connecting said second control voltage to the phase control windings of said modulator.

5. A power source for delivering two A. C. voltages at quadrature and of equal amplitude comprising a raw power source having phases 1, 2, 3, and 4 substantially at quadrature, means for combining phase 1 and phase 4 to produce a master phase, means for combining phase 1 and phase 2 to produce a quadrature voltage roughly at quadrature with said master phase, a phase modulator effective to vary relative proportions of phase 1 and phase 2 whereby said quadrature phase approaches exact quadrature with respect to said master phase, an amplitude modulator effective to vary absolute magnitudes of phase 1 and phase 2 whereby said quadrature voltage approaches the same absolute value as said master phase, a phase detector effective to compare said master phase with said quadrature phase for quadrature and produce an error output voltage proportional to the deviation from quadrature, an amplitude detector effective to compare said master phase with said quadrature phase for equal amplitude and produce an error output voltage proportional to the deviation from equality of amplitude, means for connecting the error output voltage of said phase detector as a control voltage to said phase modulator, and means for connecting the error output voltage of said amplitude detector as a control voltage to said amplitude modulator.

6. A linear phase modulator comprising means for generating a first A. C. voltage representing a vector quantity of fixed amplitude and variable phase, means for generating a second A. C. voltage of like frequency representing a vector quantity of variable amplitude and fixed phase, the phase of said first voltage being linearly related to and regulated by the amplitude of said second voltage in predetermined relationship, and means to control the amplitude of said second voltage.

7. In a computer utilizing phase and amplitude controlled A. C. voltages to simulate vectors in a two dimensional Cartesian reference frame, means to simulate a first vector extending from a focus of a conic section which is symmetrical with respect to the *x*-axis to a point on the locus of said conic section, means to simulate a second vector extending parallel to said *x*-axis from the directrix of said conic section to said point, means to multiply said second vector by the eccentricity of said conic section, comparing means effective to produce an error voltage corresponding to the deviation from equality of amplitude of the product compared with said first vector, and correcting means controlled by said error voltage effective to vary at least one of said vectors to cause said product and said first vector to approach equality.

8. A phase and amplitude modulator comprising first and second magnetic amplifiers, a first source of A. C. voltage connected to the controlled windings of said first magnetic amplifier, a second source of A. C. voltage having the same frequency as the voltage produced by said first source but out of phase therewith by a predetermined amount connected to the controlled windings of said second magnetic amplifier, a first control winding effective when energized by a control signal to control the saturation of said first and second magnetic amplifiers in the same sense, a second control winding effective when energized by a control signal to control the saturation of said first and second amplifiers in an opposing sense, and means for combining voltages across controlled windings of said first and second amplifiers.

9. The apparatus defined in claim 8 comprising in addition a third control winding effective when energized by a bias voltage to control the saturation of said first and second magnetic amplifiers in the same sense.

10. Apparatus for generating electrical analogues of trigonometric functions comprising sources of A. C. voltages *i* and *j* at quadrature and at unit amplitude, a potentiometer for deriving a variable amplitude voltage of *i* phase, a first phase and amplitude modulator having phase and amplitude control windings, a first transformer winding connected effective to add the outputs of said potentiometer and said first modulator, a second transformer winding coupled to said first winding being grounded at one terminal and having the other terminal as an output of the apparatus, a second phase and amplitude modulator, a third transformer winding connected effective to add the output of said second modulator to said *j* reference voltage, a first amplitude detector, a first phase detector, means for connecting the output of said amplitude detector to the amplitude control windings of said first modulator, means for connecting the output of said phase detector to the phase control windings of said first modulator, a fourth transformer winding coupled to said third winding and having one terminal connected to the ungrounded output of said second winding and the other terminal connected as an input to said first amplitude detector, means for connecting the output of said first modulator as an input to said phase detector, means for connecting said *j* reference voltage as second inputs to said first phase detector and amplitude detector, a fifth transformer winding coupled to said third winding and having one terminal grounded and the other terminal as an output of the apparatus, a second amplitude detector, a second phase detector, means for connecting the output of said second amplitude detector to the amplitude control windings of said second modulator, means for connecting the output of said second phase detector to the phase control windings of said second modulator, a sixth transformer winding having one terminal grounded and the other terminal connected to said *j* reference voltage, a seventh transformer winding having one terminal connected to ground and the other terminal connected to the output of said second modulator, an eighth transformer winding having one terminal connected to ground and the other terminal connected to said *i* reference voltage, a ninth transformer winding coupled to said sixth winding, a tenth transformer winding coupled to said seventh winding, an eleventh transformer winding coupled to said eighth winding, a twelfth transformer winding coupled to said eighth winding, means for connecting said ninth, tenth, eleventh and twelfth windings in series, means for connecting the terminal of said twelfth winding connected to said eleventh winding to the output of said first modulator, means for connecting the other terminal of said twelfth winding as an input to said second amplitude detector, a thirteenth transformer winding having one terminal connected to ground and the other terminal connected to said ninth winding, a fourteenth transformer winding coupled to said thirteenth winding and having one terminal grounded and the other terminal connected as an input to said second amplitude detector, means for connecting said *i* reference voltage as one input to said second phase detector, and means for connecting the output of said second modulator as a second input to said second phase detector.

11. Apparatus for generating electrical analogues of cranks of a three bar linkage cell comprising sources of unit reference voltages *i* and *j* at quadrature, a source of voltage representing the independent variable, a first linear phase modulator connected effective to receive said voltage representing the independent variable as the input, a phase and amplitude modulator having phase and amplitude control windings, an amplitude detector, means for connecting the output of said amplitude detector to the amplitude control windings of said phase and amplitude modulator, a phase detector, means for connecting the output of said phase detector to the phase control windings of said phase and amplitude modulator, a second linear phase modulator, means for connecting the output of said phase and amplitude modulator as an input to said second linear phase modulator, a first transformer winding having one terminal grounded and the other terminal connected to the output of said second linear phase modulator, a second transformer winding coupled to said first winding and having one terminal connected to the output of said first linear phase modulator, a third transformer winding having one terminal grounded and the other terminal connected to said source of $i$ reference voltage, a fourth transformer winding coupled to said third winding and having one terminal connected to the other terminal of said second winding and having the other terminal connected as an input to said one amplitude detector, a fifth transformer winding coupled to said third winding and having one terminal grounded and the other terminal connected as an input to said amplitude detector, means for coupling the output of said phase and amplitude modulator as an input to said phase detector, and means for connecting said source of $j$ reference voltage as the other input to said phase detector.

12. In an analogue computing system of the type wherein vectors in a Cartesian reference frame are simulated by single frequency alternating current voltages in variable amplitude and phase relationships, electrical circuit means for deriving a voltage simulating $x$ and $y$ is given and vice versa for the point $(x, y)$ on an ellipse having major and minor axes coincident with the $x$ and $y$ axes respectively of the reference frame, comprising sources of A. C. voltages $id$, $ix$ and $ia$ representing the distance from the origin to a focus, the independent variable, and one half the length of the major axis respectively, a first transformer winding having first and second terminals with said first terminal grounded and said second terminal connected to a source of A. C. voltage representing the independent variable, a phase and amplitude modulator having phase and amplitude control windings, a second transformer winding coupled to said first winding and having the first terminal connected to the output of said modulator, a third transformer winding having the first terminal grounded and the second terminal connected to the second terminal of said second winding, a fourth transformer winding coupled to said third winding and having the first terminal connected to said $id$ voltage source, a first resistor, a first rectifier ring connected between ground and the second terminal of said fourth winding and effective to impress its rectified output across said first resistor, a fifth transformer winding having the first terminal connected to said $id$ voltage source and the second terminal connected to the juncture of said second and third windings, a sixth transformer winding coupled to said fifth winding, a second resistor, a second rectifier ring connected between first and second terminals of said sixth winding and effective to impress its rectified output across said second resistor, a seventh transformer winding having the first terminal connected to ground and the second terminal connected to said source of voltage $ia$, an eighth transformer winding coupled to said seventh winding, a third resistor, a third rectifier ring connected between first and second terminals of said eighth winding and effective to impress its rectified output across said third resistor, means effective to connect said first, second and third resistors in series with the voltages across said first and second resistors adding together and opposing the voltage across said third resistor, means effective to connect the net voltage across said series resistors to the amplitude control windings of said modulator, a phase detector, means effective to connect the output of said modulator as a first input to said phase detector, means effective to connect a voltage of phase $i$ as a second input to said phase detector, and means effective to connect the output of said phase detector to the phase control windings of said modulator.

References Cited in the file of this patent

UNITED STATES PATENTS

| | | |
|---|---|---|
| 2,385,334 | Davey | Sept. 25, 1945 |
| 2,436,834 | Stodola | Mar. 2, 1948 |
| 2,508,270 | Konigsberg | May 16, 1950 |
| 2,597,315 | Gray | May 20, 1952 |
| 2,600,264 | Proctor | June 10, 1952 |
| 2,610,789 | Hales | Sept. 16, 1952 |
| 2,627,598 | Browder et al. | Feb. 3, 1953 |
| 2,812,132 | Hauser | Nov. 5, 1957 |

FOREIGN PATENTS

| | | |
|---|---|---|
| 466,131 | Great Britain | May 24, 1937 |
| 579,325 | Great Britain | July 31, 1946 |
| 620,867 | Great Britain | Mar. 31, 1949 |

OTHER REFERENCES

"Electronic Instruments," Greenwood, Holdam and MacRae, McGraw-Hill, 1948. Figures 3.12 and 14.5 relied upon.

"A Circuit for Generating Polynomials and Finding Their Zeros," F. W. Bubb, Jr., Proceedings of the I. R. E., December 1951, vol. 39, No. 12; pages 1556–1561.